United States Patent [19]
Slater

[11] Patent Number: 6,098,053
[45] Date of Patent: Aug. 1, 2000

[54] SYSTEM AND METHOD FOR PERFORMING AN ELECTRONIC FINANCIAL TRANSACTION

[75] Inventor: Alan Slater, East Brunswick, N.J.

[73] Assignee: Citibank, N.A., New York, N.Y.

[21] Appl. No.: 09/237,739

[22] Filed: Jan. 26, 1999

Related U.S. Application Data

[60] Provisional application No. 60/072,878, Jan. 28, 1998, and provisional application No. 60/097,501, Aug. 21, 1998.

[51] Int. Cl.$^7$ .................................................. G06F 17/60
[52] U.S. Cl. ............................................. 705/44; 705/35
[58] Field of Search .................. 705/44, 35; 364/479.02; 380/23

[56] References Cited

U.S. PATENT DOCUMENTS

| | | | |
|---|---|---|---|
| 4,965,568 | 10/1990 | Atalla et al. | 340/825.34 |
| 5,351,296 | 9/1994 | Sullivan | 380/24 |
| 5,517,569 | 5/1996 | Clark | 380/52 |
| 5,590,197 | 12/1996 | Chen et al. | 380/24 |
| 5,677,955 | 10/1997 | Doggett et al. | 380/24 |
| 5,757,917 | 5/1998 | Rose et al. | 380/25 |
| 5,781,632 | 7/1998 | Odom | 380/24 |
| 5,793,028 | 8/1998 | Wagener et al. | 235/380 |
| 5,809,143 | 9/1998 | Hughes | 380/24 |
| 5,822,737 | 10/1998 | Ogram | 705/26 |
| 5,832,464 | 11/1998 | Houvener et al. | 705/45 |
| 5,862,223 | 2/1999 | Walker et al. | 380/25 |
| 5,878,143 | 3/1999 | Moore | 380/25 |
| 5,878,337 | 3/1999 | Joao et al. | 455/406 |
| 5,883,810 | 3/1999 | Franklin et al. | 364/479.02 |
| 5,884,271 | 3/1999 | Pitroda | 705/1 |
| 5,933,816 | 8/1999 | Zeanah et al. | 705/35 |
| 5,937,396 | 8/1999 | Konya | 705/43 |
| 5,952,638 | 9/1999 | Demers et al. | 235/379 |
| 5,953,422 | 9/1999 | Angelo et al. | 380/23 |
| 5,956,699 | 9/1999 | Wong et al. | 705/39 |
| 5,956,700 | 9/1999 | Landry | 705/40 |

FOREIGN PATENT DOCUMENTS

| | | | |
|---|---|---|---|
| 0 385 400 A2 | 9/1990 | European Pat. Off. | G07F 7/10 |
| WO 95/26085 A1 | 9/1995 | WIPO | H04K 1/00 |

OTHER PUBLICATIONS

Peterson, S., "Startup adds twist to e-payments," *PC Week Online*, May 31, 1999. (http://www.zdnet.com/pcweek/stories/news/0,4153,405327,00.html).

*Primary Examiner*—Allen R. MacDonald
*Assistant Examiner*—Forest Thompson, Jr.
*Attorney, Agent, or Firm*—Kilpatrick Stockton LLP; George T. Marcou; James J. Bindseil

[57] ABSTRACT

A system and method for performing an on-line ATM/POS transaction utilizing checking or savings account funds over a public access network is disclosed. The invention comprises creating an electronic financial transaction instruction comprising card information and security information that are encrypted for secure transmission over the public access network. The card information identifies a checking or savings account number of a purchaser. The security information identifies a personal identification number associated with the identified account number that authorizes the use of the account number in an on-line ATM/POS transaction. The financial transaction instruction is decrypted by a financial institution and reformatted to form a transaction request suitable for transmission over an on-line ATM/POS transaction system. The transaction request is then processed like a typical ATM or merchant POS on-line ATM/POS transaction. As such, approval and settlement of the financial transaction instruction is obtained in real time. Thus, the present invention provides an on-line ATM/POS transaction capability utilizing checking or savings account funds from a public access network, such as the Internet or electronic mail.

47 Claims, 8 Drawing Sheets

SYSTEM AND METHOD FOR PERFORMING AN ELECTRONIC FINANCIAL TRANSACTION

CROSS-REFERENCE TO RELATED APPLICATIONS

This application claims the benefit of U.S. Provisional Application No. 60/072,878 filed Jan. 28, 1998 and U.S. Provisional Application No. 60/097,501 filed Aug. 21, 1998.

BACKGROUND OF THE INVENTION

The present invention relates to electronic funds transfer instruments, and more particularly, to performing secure financial transactions over a public access network using checking and savings account funds.

With the increasing commercialization of the Internet, new methods of performing secure and verifiable payment transactions are desired. The most common methods in use today, for example, require a purchaser to enter credit card or non-PIN-based debit card information and send it, unsecured or secured by encryption, to a merchant. The merchant decrypts the card information and uses it to complete the transaction. This type of transaction is known as a Mail Order Telephone Order (MOTO) transaction. MOTO transactions are disadvantageous from a merchant standpoint, however, because they are costly and risky. A merchant's cost for performing a MOTO transaction may be 5% or more of the entire transaction amount. MOTO transactions are risky because the merchant has no idea with whom they are actually dealing. Because a personal identification number (PIN) is not required, the only authorization-type of check that a merchant can use in a MOTO transaction is to verify the mailing address given by the purchaser with the issuing card company's mailing address for the card number. Often, the merchant must pay a fee to the card company to be supplied with this mailing address information. Further, the merchant, as opposed to the card company, assumes liability for a shipment in a MOTO transaction if no address confirmation is obtained.

For example, for a debit card linked to a credit card account, a consumer does not need to enter a PIN when they have a Visa® or Mastercard® logo on their debit card. The transaction is performed like a credit transaction, but the funds are taken out of their checking account. That transaction goes through the Visa/Mastercard credit network, and as a result the merchant pays the 5% or more discount fee because the transaction is treated like a credit card transaction even though it winds up being charged to a checking account. For the merchant, the transaction is settled along with other credit card transactions, with the settlement occurring usually the night of the transaction, or the following day. For the purchaser, the transaction may not be charged to their account for several days.

A second type of POS transaction utilizes the automated teller machine (ATM) network, making it a completely on-line and real time transaction. This type of on-line ATM/POS transaction is performed at ATM machines or merchant POS terminals directly connected to the ATM network. For this type of transaction, a purchaser dips or swipes their ATM, debit or check card, enters their PIN, and the network recognizes this as an on-line ATM/POS transaction and routes it through the same network that is used for ATM transactions. As part of that routing process, the network is set up to route the transaction according to a Bank Identification Number (BIN) included in a Primary Account Number (PAN), which is the embossed number on the card.

The embossed number on the card is also stored on the magnetic stripe of the card, or for a smart card, within the memory of the microcomputer chip on the card. The BIN consists of the first six digits of the embossed number, according to International Standards Organization (ISO) standard number ISO 7812. Further, ISO provides the BIN numbers worldwide to insure that there is no duplication. The BIN tells the ATM network how to route the transaction so that it gets back to the purchaser's bank, and each bank that accepts one of these on-line ATM/POS transactions has a cross-reference between the embossed number and the actual account number. The on-line ATM/POS transaction creates an on-line authorization that verifies the card number and PIN, and determines if the card is lost or stolen or if the associated account is blocked. Further, the associated bank account is checked to determine if there are sufficient funds to cover the transaction amount. The transaction is then settled the same business day through the ATM networks.

An on-line ATM/POS transaction is beneficial to both the purchaser and the merchant. For the purchaser who would normally roll-over some or all of a credit card transaction, the on-line ATM/POS transaction is beneficial because it saves the purchaser from having to pay finance charges. For the merchant, an on-line ATM/POS transaction is beneficial because the cost to the merchant for this type of transaction is based on a fixed fee. The fixed fee is typically less than the percentage of the transaction amount charged for credit transactions, especially for transaction amounts over about $10–$12 U.S. dollars. Thus, on-line ATM/POS transactions are typically more desirable for the merchant for these dollar amount transactions.

Currently, the ATM network is not set up to handle the entry of a purchaser's actual account number into an ATM or merchant POS terminal and have that account number sent through the network. This is because the actual account number is not in the proper format and contains no routing instructions. Similarly, the ATM network cannot handle the direct entry of a bank's routing transit number followed by an account number, for the same reasons. Even though the BIN provides routing instructions, it is not the same number as a bank routing transit number, which is used to route paper checks, wire transfers and Automated Clearing House transactions. Thus, transactions utilizing merchant POS and ATM terminals are the only current methods commercially available for an on-line, real time financial transaction utilizing checking or savings account funds.

In an effort to expand the available sources of payment, methods have been developed to utilize checking account funds to perform Internet transactions. These methods allow the use of "electronic checks" to perform transactions. One example of such an electronic check is the "echeck" process established by the Financial Services Technology Consortium (FSTC). There are a number of problems, however, associated with current electronic check methods. For example, since the flow of the current electronic check replicates the flow used for paper checks, there is a delay between the time that the electronic check is endorsed and the time that the electronic check is approved for payment. This delay may be one or more days. For example, the electronic check transaction flow goes from the purchaser to the merchant to the check service provider. The check service provider issues a debit over the Automated Clearing House (ACH) network or the Electronic Check Processing (ECP) to the purchaser's account. The ACH or ECP debit may take a couple of days to get to the purchaser's bank, depending on how long the check service provider holds on to the money to gain float revenue. Also, there is the possibility that the ACH or ECP debit may be returned (like a bounced check) if there are not enough funds in the account. As a result, the merchant typically must wait a number of days to find out whether or not the funds are good, thereby delaying fulfillment of the order. As such, utilizing this type of electronic check creates uncertainty for the merchant, as they are unsure if the electronic check will be paid. Thus, despite the transaction having the appearance to the purchaser of being on-line and real time, it takes several days for their account to be charged and for the transaction to be completely processed.

Additionally, because the typical electronic check process replicates the paper check process, the transaction flow requires the merchant's bank to have the electronic check capability. For a consumer to be able to use this type of electronic check, however, the consumer must be a member of a bank or financial institution that offers this service. Over the next 5 to 10 years, however, only a few dozen financial institutions are estimated to participate in issuing electronic checks. Because of this limited participation, the majority of purchasers will not have access to electronic checks from the financial institution with whom they have an account relationship. Thus, in turn, the number of purchasers that a merchant can attract and serve with an electronic check is limited.

Additionally, for example, not only must the purchaser be a member of a participating financial institution, but the merchant must set up procedures for these types of transactions to deal with the limited number of participating financial institutions. Due to the limited number of customers who would utilize this payment method, a merchant may be discouraged from expending the time and money to establish such a system.

Another scheme requires the purchaser to deposit funds into a trusted third party's account before the purchaser can perform a transaction. This scheme is fraught with inefficiencies. For example, inefficiencies include the time wasted as purchaser must plan ahead in order to deposit the funds, and also the time wasted in finding a third party mutually trusted by the purchaser and the merchant. Thus, the use of trusted third parties is not desirable for on-line, real time transactions.

Further, with the Internet serving a worldwide market, there is a desire for allowing a purchaser using one currency to perform an on-line, real time financial transaction with a merchant using another currency. The ATM network discussed above allows this type of transaction to occur. For example, a United States citizen traveling in a foreign country can utilize their ATM debit card in a local ATM to get a designated amount of the local currency. The functionality exists within the ATM network to convert the amount of local currency obtained into a corresponding amount of United States dollars and debit the appropriate amount.

Currently, there is a need for low cost access to checking and savings accounts to perform financial transactions over the Internet. There is no current mechanism, however, that connects the ATM network to purchasers on the Internet. Most purchasers access the Internet from remote locations, such as personal computers at home or at a business. Meanwhile, access to the ATM network is typically provided only through ATM machines and POS merchant terminals directly connected to the network. Thus, there is currently no mechanism that allows purchasers and merchants using the Internet or electronic mail the real-time, on-line ATM/POS transaction functionality provided by the on-line ATM/POS transaction system.

SUMMARY OF THE INVENTION

A preferred embodiment of the present invention comprises a system for a purchaser to perform an on-line ATM/POS financial transaction from a personal computer over a public access communications network utilizing a universally acceptable electronic financial transaction instruction that debits a purchaser's checking or savings account. The financial transaction instruction is provided in a secured format for transactions sent over the public access communications network, which is external from an on-line ATM/POS transaction system. The system of the present invention utilizes card and security information to authenticate the purchaser and validate their authority to initiate the financial transaction instruction to debit the identified account. Further, the system utilizes a secure mechanism to protect the card and security information as it is transmitted over the public access network to a financial institution providing access to the on-line ATM/POS transaction system. The system of the present invention advantageously does not require an account relationship between the purchaser, the merchant, and the financial institution providing access to the on-line ATM/POS system. Further, the system beneficially does not require the bank used by the purchaser and/or the bank used by the merchant to have the capability to perform financial transaction instructions over the Internet. Additionally, the system is compatible with current financial transaction systems, thus making the present financial transaction instruction a universally acceptable on-line ATM/POS transaction from a source external from the on-line ATM/POS transaction system.

According to a preferred embodiment, a method of performing a financial transaction between a purchaser and a merchant, comprises creating purchaser payment instructions comprising encrypted, electronic representations of a purchaser transaction amount, card information and security information. The card information identifies a checking or savings account at purchaser's bank and the security information comprises a personal identification number associated with the identified card number for authorizing its use in an on-line ATM/POS transaction. The card information and the security information must be encrypted, using an encryption method dictated by on-line ATM/POS transaction system standards. The purchaser payment instructions are protected by a first secure mechanism, such as encryption or digital signature. The digital signature of the purchaser provides verification of the identity of the purchaser and the integrity of the purchaser payment instruction. The purchaser payment instructions are electronically delivered to the merchant, such as over a public access network like the Internet. Merchant payment instructions are appended to the purchaser payment instructions to create financial transaction instructions. The merchant payment instructions comprise merchant identification and merchant deposit account identification used in performing the transaction. The financial transaction instructions are protected by a second secure mechanism, such as with encryption and/or by the digital signature of the merchant. The merchant's digital signature provides verification of the merchant's identity and of the integrity of the financial transaction instructions. A digital certificate of the merchant may be appended to the financial transaction instructions, where the merchant's digital certificate provides additional verification of the merchant's identity and the integrity of the financial transaction instructions.

The financial transaction instructions are electronically delivered, such as over the Internet, to a financial institution offering access to the on-line ATM/POS transaction system to perform the financial transaction. The financial institution removes and reformats the encrypted financial transaction instructions to form an ATM/POS transaction request. Reformatting the information comprises placing the ATM/POS transaction request in a form accepted by the on-line ATM/POS transaction system. The ATM/POS transaction request is electronically delivered to the purchaser's bank through the on-line ATM/POS transaction system. A response message is received at the financial institution from the purchaser's bank through the on-line ATM/POS transaction system, where the response message is an approval if the financial transaction is acceptable and a denial if the financial transaction is unacceptable. An authorization message is electronically delivered to the merchant to indicate whether the response message is an approval or a denial. If the response message is an approval, then the identified account number is debited by the transaction amount and a credit equivalent to the transaction amount is sent to the merchant's deposit account. Thus, the present invention provides a system and method for a low cost, electronic financial transaction instruction for an on-line ATM/POS transaction from a source external from the on-line ATM/POS transaction system utilizing checking or savings account funds.

DETAILED DESCRIPTION OF THE INVENTION

Figure 1:
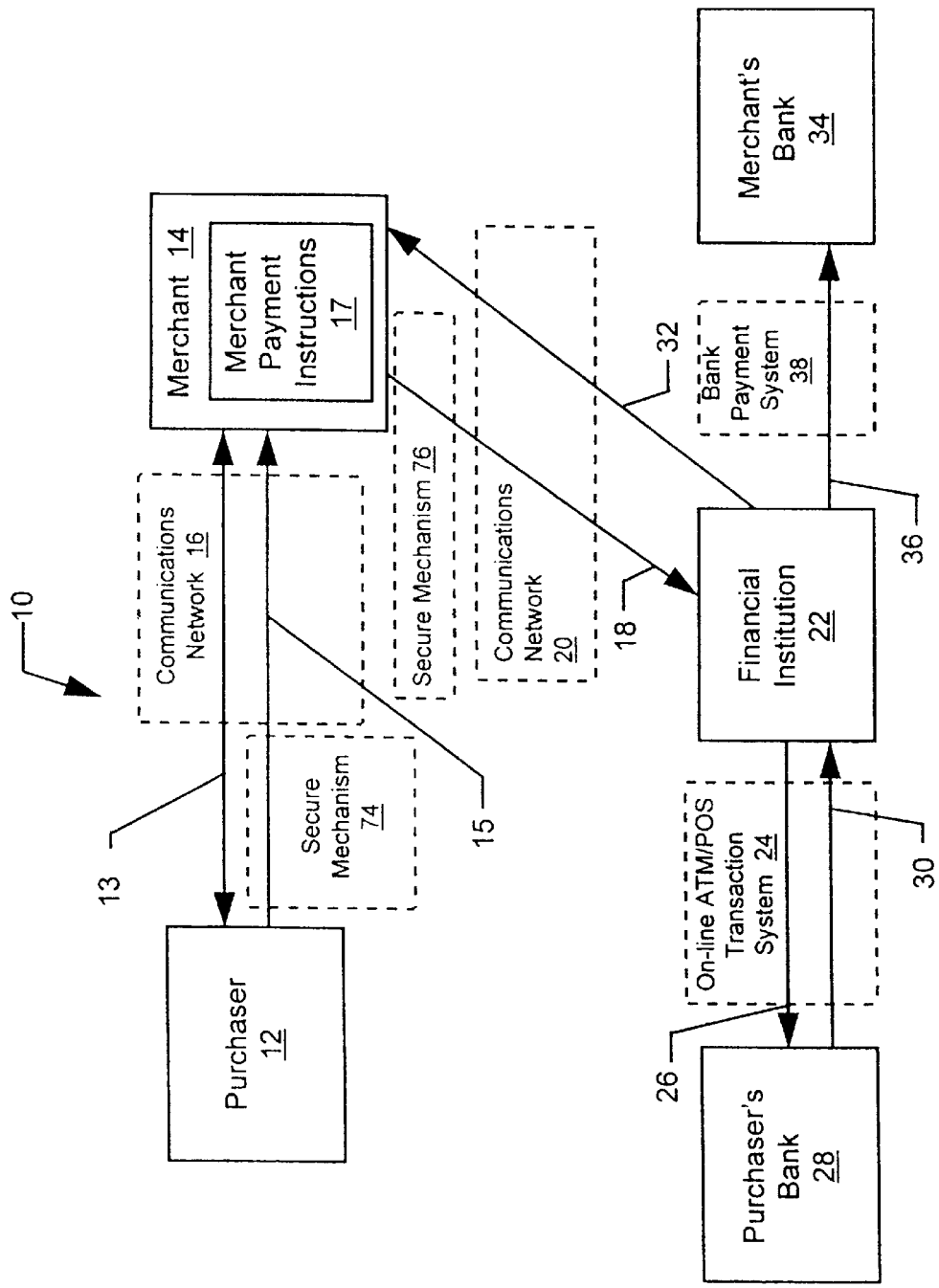
FIG. 1 is a schematic representation of one embodiment of a system according to the present invention.

The present invention comprises a system and method for a purchaser to perform an on-line ATM/POS transaction utilizing checking and savings account funds from a transaction source external from the on-line ATM/POS transaction system, such as a personal computer connected to the Internet. According to one preferred embodiment of the present invention, referring to FIG. 1, a system 10 for performing a financial transaction comprises a purchaser 12 remotely interacting 13 with a merchant 14 over a communications network 16, such as a public access network like the Internet and its World Wide Web or electronic mail (e-mail) protocols, and other similar networks. Purchaser 12 provides merchant 14 with digitally signed and/or encrypted, electronic purchaser payment instructions 15. Purchaser payment instructions 15 include encrypted card information and security information. Merchant 14 adds merchant payment instructions 17, such as merchant identification and transaction amount information, to purchaser payment instructions 15 to form an electronic financial transaction instruction 18 that the merchant digitally signs and/or encrypts. Financial transaction instructions 18 thus comprise data suitable for performing an on-line ATM/POS transaction. Merchant 14 remotely transfers financial transaction instruction 18 over communications network 20, which is similar or the same as communications network 16, to a financial institution 22. In an alternate embodiment, merchant 14 may send financial transaction instruction 18 to a merchant service provider that handles the merchant's financial transactions, which then forwards the financial transaction instruction to financial institution 22. Financial institution 22 is a bank or other service provider that provides purchaser 12 with indirect access to the on-line ATM/POS transaction system 24, such as the ATM network. As such, financial institution 22 removes the data suitable for performing an on-line ATM/POS transaction from financial transaction instruction 18. Financial institution 22 formats the data into a standard ATM/POS transaction request 26 and performs a standard ATM/POS transaction, just like a transaction performed at an ATM or at a merchant POS terminal.

As such, financial institution 22 sends transaction request 26 to purchaser's bank 28 through on-line ATM/POS transaction system 24. Purchaser's bank 28 returns a response message 30 to financial institution 22 comprising an authorization if transaction request 26 is approved, or a denial if not approved. Correspondingly, purchaser's bank 28 debits an account identified in transaction request 26 if the request is approved. Financial institution 22 notifies merchant 14 of the approval status of the financial transaction instruction 18 by sending an authorization message 32 over network 20. Correspondingly, if the transaction is approved, financial institution 22 provides merchant's bank 34 with a credit 36 through a bank payment system network 38, such as the Automated Clearing House (ACH). Upon receiving authorization message 32, merchant 14 may then complete the transaction, if required. As a result, purchaser 12 and merchant 14 perform a financial transaction with a guaranteed payment that is authorized in real time and on-line. Thus, the present invention provides a system and method for an on-line ATM/POS transaction over a public access network external from the on-line ATM/POS transaction system.

Typically, on-line ATM/POS transactions are only performed at sources that are directly connected to the on-line ATM/POS transaction system through a hard-wired, direct connection to an on-line ATM/POS service provider, such as financial institution 22. The hard-wired, direct connection is typically a private telephone line that is leased from the service provider or from the ATM/POS network provider. For example, ATM's and merchant POS terminals are directly connected to the on-line ATM/POS transaction system. As such, access to the on-line ATM/POS network is generally restricted to these sources.

In contrast, the present invention is a system that provides on-line ATM/POS transaction capability over a public access network or open network, such as the Internet. The rise in commerce being performed over public access networks with no direct connections to, or that are external from, the on-line ATM/POS system has created a new point-of-sale. One example of such a new point of sale is a personal computer connected to the Internet. These new points-of-sale, however, are outside of the current paradigm for connection to the on-line ATM/POS system. As a result, reliable and secure methods for performing an on-line ATM/POS transaction from these new POS sources are lacking. Therefore, the present invention beneficially allows a consumer the convenience of utilizing checking or savings account funds in an on-line ATM/POS transaction from a source that is remote from the on-line ATM/POS system, such as the Internet, thereby resulting in an external ATM/POS transaction that is on-line and in real time.

As used herein, the term "purchaser" refers to an entity that is exchanging value for a good, a service or for other value. The purchaser is the owner of, or rightfully has access to, the savings or checking account that comprises the funds or value utilized by the purchaser in the transaction. The term "merchant" refers to an entity that is exchanging a good, a service or value for the purchaser's value. Typically, the purchaser is on a public access network, such as the Internet, buying items from the merchant. Although, as one skilled in the art will realize, many other similar financial transactions may be performed utilizing the present invention.

Financial transaction instruction 18, as is discussed in more detail below, comprises all of the data necessary to perform an on-line ATM/POS transaction. Typically, this information comprises information concerning the purchaser, the merchant and the transaction. Purchaser information may comprise name identification, a card number used as a source of value for debiting, and a personal identification number (PIN) for authenticating the purchaser for use of the card number. The card number is then cross-referenced to an account number within the systems of purchaser's bank. Similarly, merchant information may include name identification, and an account number for crediting with value. Finally, transaction information or purchase order information may comprise the quantities, identification and prices of goods and services, the transaction amount, the transaction date and the transaction time, etc. All of this information is typically contained in purchaser and merchant payment instructions, as is discussed below.

Figure 2A:
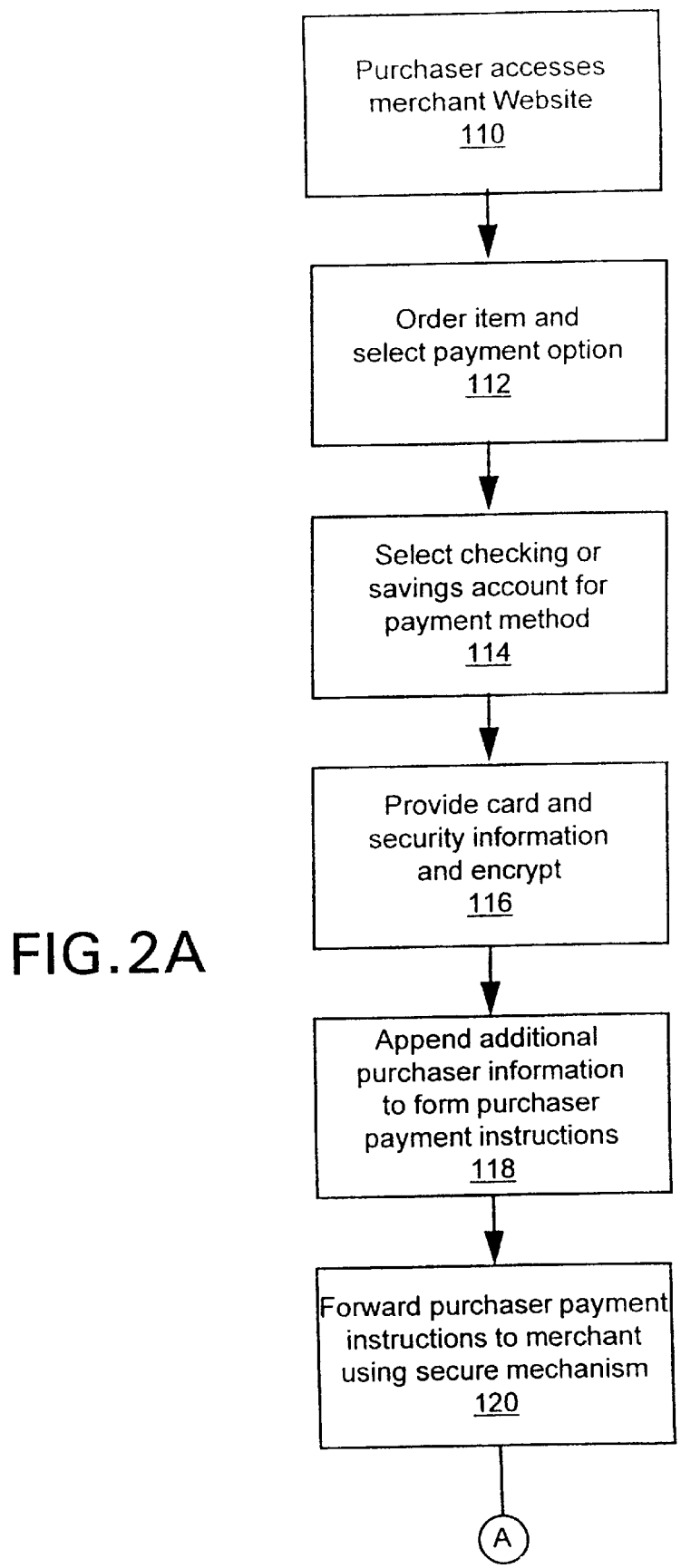
FIGS. 2A–2C are flow charts representing one embodiment of a method of the present invention.
Figure 2B:
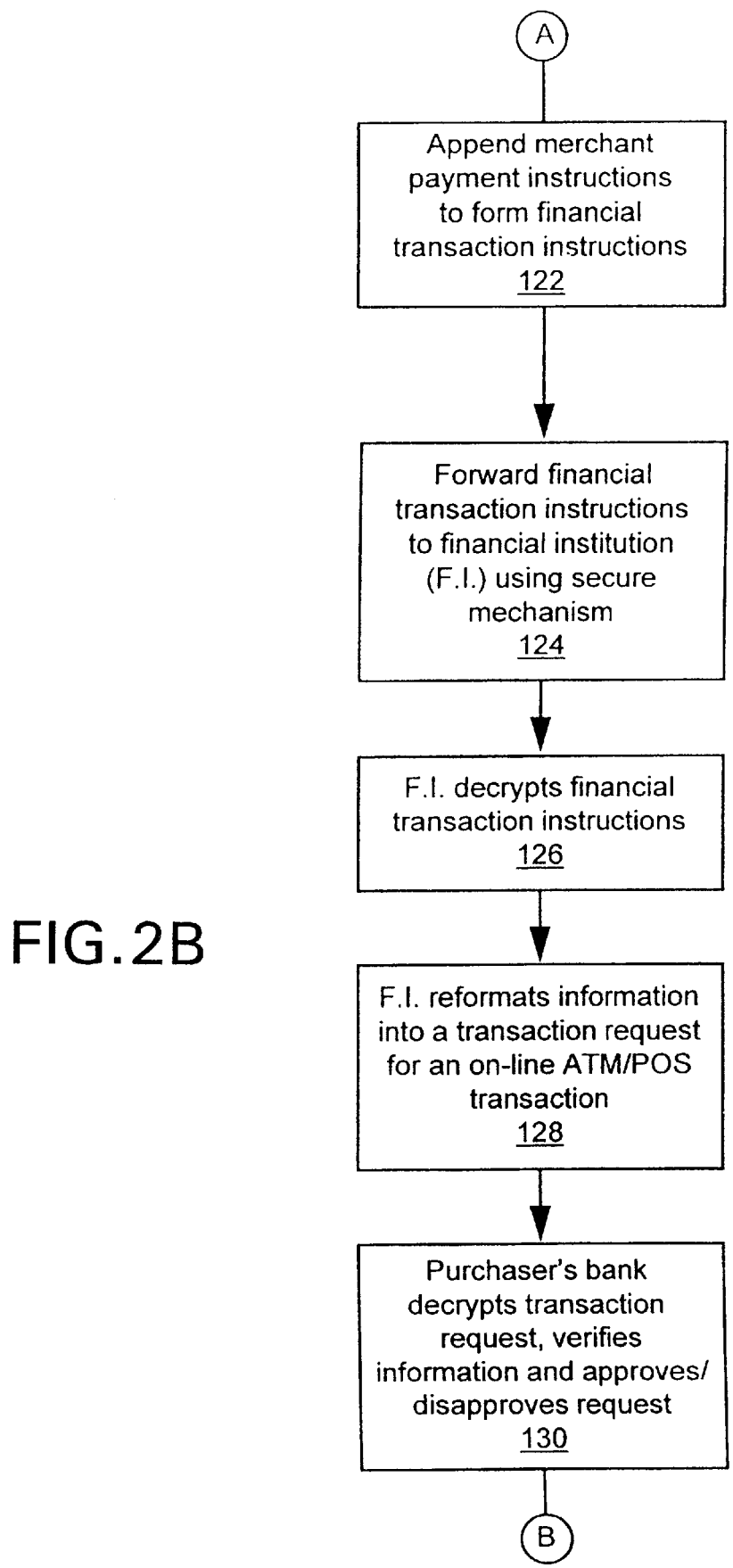
Figure 2C:
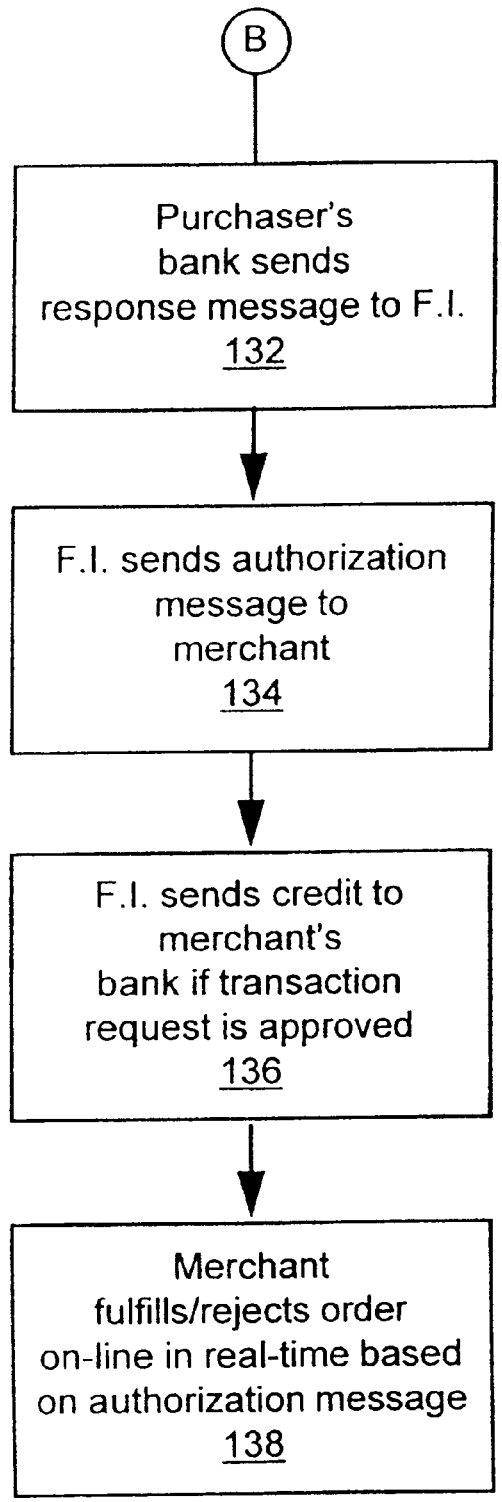

Referring to FIGS. 2A–2C and 3, a preferred system 10 of the present invention comprises purchaser 12 making a purchase from merchant 14, such as a purchaser accessing a merchant's World Wide Web site with a personal computer or other source that is external from, or not directly connected to, the on-line ATM/POS transaction system 24 (FIG. 2, Block 110). Upon placing an order for an item from the site, purchaser 12 is presented with a number of payment options (Block 112). One of the payment options is to perform the transaction utilizing funds from the purchaser's checking or savings account. Upon selecting this option (Block 114), purchaser 12 is prompted to provide card information 39 (FIG. 3) and security information 40 (FIG. 3) to identify and authenticate themself and validate the transaction (Block 116).

Figure 3:
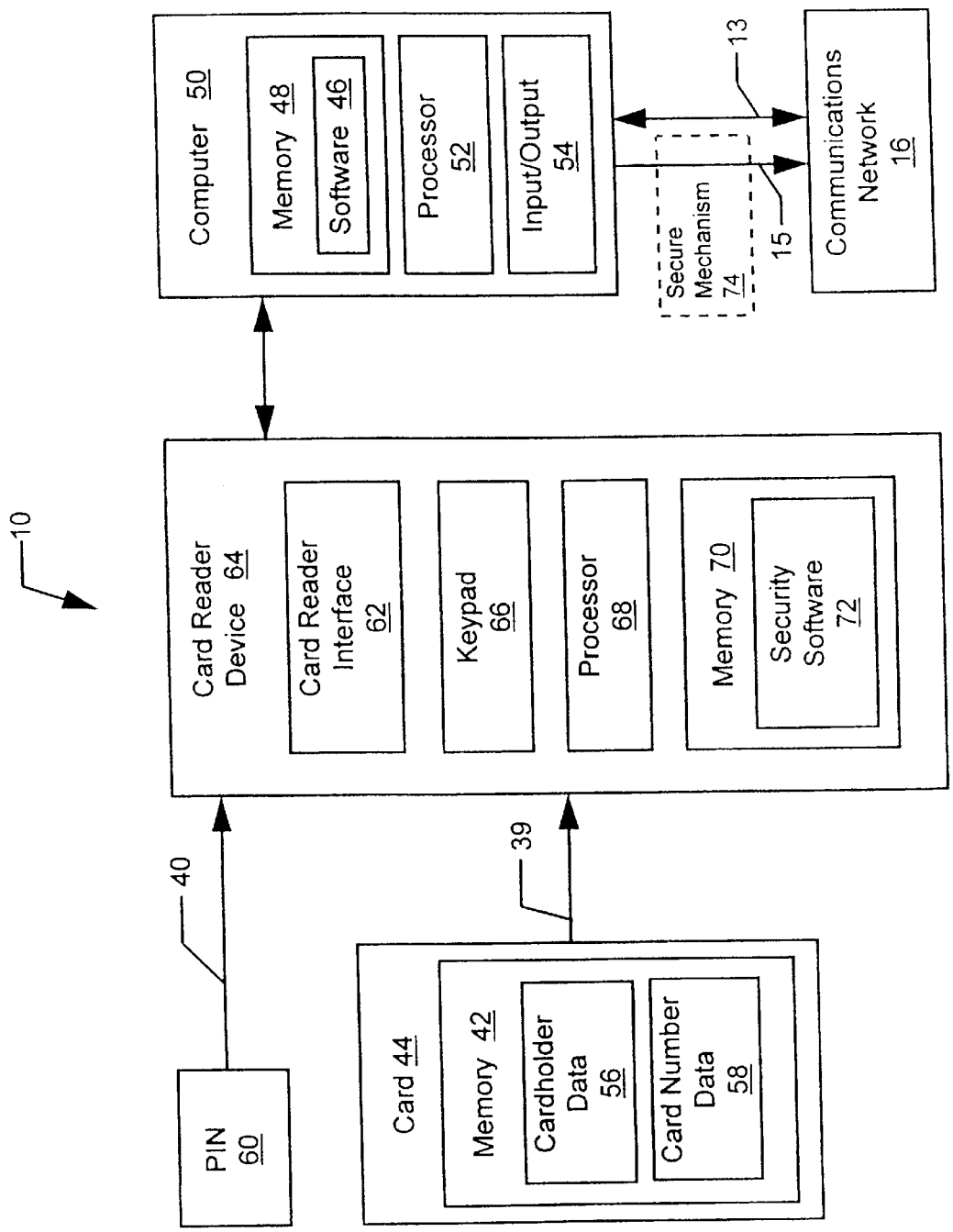
FIG. 3 is a more detailed schematic representation of a portion of the system of FIG. 1.

Referring to FIG. 3, card information 39 is contained in memory 42 on card 44, such as an ATM, debit and smart card, or is contained within software 46 within memory 48 of computer 50 utilized by purchaser 12. Computer 50, such as a personal computer located at the purchaser's home or business, may further comprise a processor 52 and an input/output 54 connected to communications network 16. Card information 39 may comprise cardholder data 56, such as the name of the cardholder, and card number data 58. Card number data 58 includes a bank identification number used to direct the transaction through on-line ATM/POS system 24 (FIG. 1). Further, card number data 58 includes a number that is associated with the actual savings or checking account number in purchaser's bank 28 to be used to fund the transaction. Also, card information 39 may comprise any other type of data that purchaser's bank 28 may choose to include in memory 42 as allowed by ISO standards. The ATM card comprises a magnetic stripe that holds card information 39, while the smart card contains similar information within an embedded microcomputer. Additionally, security information 40 comprises a secret number known by the cardholder and the card issuer, such as a personal identification number (PIN) 60. PIN 60 is a number that is used by a cardholder to identify themself to their bank to authorize on-line ATM/POS transactions.

Purchaser 12 may enter card information 39 and security information 40 by placing card 44 into communication with card reader interface 62 of card reader device 64 and by entering PIN 60 into keypad 66 of the card reader device. For example, the purchaser may use a Citibank® ATM card and insert it into a magnetic stripe reader/writer device. Alternatively, the purchaser may use a Citibank® Smart Card and insert it into a smart card reader/writer device, such as the PC PAY® PC2200 product from Innovonics, Inc. of Phoenix, Ariz. Card reader device 64 may further comprise a processor 68 and a memory 70, including security software 72 comprising encryption algorithms. Security software 72 encrypts card information 39 and security information 40 (Block 116) according to ATM/POS network standards, which currently comprise encrypting the data according to the Data Encryption Standard (DES). DES is a symmetric encryption method where financial institution 22 (FIG. 1) holds the decryption key. Although, as one skilled in the art will realize, many other encryption methods may be utilized. Card reader device 64 forwards the encrypted card information 39 and security information 40 to computer 50, which may also add other information to form purchaser payment instructions 15 (Block 118). Purchaser payment instructions 15 may comprise many other instructions, such as purchase order information including the quantity and price of the good/service and purchaser's transaction amount, delivery information, authorization to add shipping costs up to a specified limit, authorizations to make payment in a foreign currency while debiting the account in U.S. dollars, etc.

Additionally, secure mechanism 74 is an security method utilized to protect purchaser payment instructions 15 in the transfer to merchant 14 or any other entity (Block 120) over communications network 16. Secure mechanism 74 provides integrity assurance, verifying that purchaser payment instructions 15 have not been altered, and also allows financial institution 22 to confirm the identity of purchaser 12. For example, secure mechanism 74 may comprise one or a combination of the following operations on purchaser payment instructions 15: symmetric encryption, asymmetric encryption, a purchaser's verifiable digital signature and a verifiable digital certificate. Although, as one skilled in the art will realize, many other security methods may be utilized. Preferably, purchaser payment instructions 15 are digitally signed by purchaser 12. The digital signature of purchaser 12 verifies purchaser's identity and that purchaser payment instructions 15 have not been altered. This provides a first level of protection for transmitting purchaser payment instructions 15 over communications network 16. A digital certificate may also be used to provide verification of the identity of the sender, as well as providing the sender's public key for use in sending an encrypted response back to the sender.

A second level of privacy and protection comprises encrypting the digitally signed purchaser payment instructions 15 before transmission to merchant 14. Depending on the what kind of privacy is required, and between which parties, this second level of privacy provided by secure mechanism 74 may comprise any or a combination of symmetric and asymmetric encryption. For example, purchaser 12 may want or allow merchant 14 to have access to the portion of purchaser payment instructions 15 comprising the purchase order information. In this case, then an encryption method is chosen that allows merchant 14 and financial institution 22 the ability to decrypt this portion of purchaser payment instructions 15. In this case, however, financial institution 22 is still the only party able to decrypt the encrypted card information 39 and security information 40 within purchaser payment instructions 15. Alternatively, purchaser 12 may encrypt the digitally signed purchase payment instructions 15 in such as way so that decryption of the whole purchaser payment instructions 15 may be performed only by financial institution 22. Thus, secure mechanism 74 provides a first level of protection with the digital signature, and a further level of protection and privacy with encryption of the digitally signed purchaser payment instructions 15. Therefore, purchaser 12 provides merchant 14 with purchaser payment instructions 15 that comprise optionally encrypted, digitally signed and DES encrypted card information 39 and security information 40 utilized in an on-line ATM/POS transaction.

Merchant 14 appends merchant payment instructions 17 to purchaser payment instructions 15 to form financial transaction instructions 18 (Block 122). Merchant payment instructions 17 may comprise information identifying merchant's bank 34 and merchant's deposit account number for crediting, as well as other similar merchant information related to the transaction. Merchant payment instructions 17 may also include purchase order information including merchant's transaction amount, merchant identification information, the currency to be utilized, etc. Secure mechanism 76 (FIG. 1) is utilized to protect the transmission of financial transaction instructions 18, comprising the secure mechanism 74 protected purchaser payment instructions 15 and merchant payment instructions 17, over communications network 20. Secure mechanism 76, similar to secure mechanism 74, provides integrity assurance by verifying that financial transaction instructions 18 have not been altered, and also allows financial institution 22 to confirm the identity of merchant 14. For example, secure mechanism 76 may comprise one or a combination of the following operations on financial transaction instructions 18: symmetric encryption, asymmetric encryption, a purchaser's verifiable digital signature and a verifiable digital certificate. Although, as one skilled in the art will realize, many other security methods may be utilized. Preferably, financial transaction instructions 18 are digitally signed by merchant 14. The digital signature of merchant 14 verifies merchant's identity and that financial transaction instructions 18 have not been altered. This provides a first level of protection for transmitting financial transaction instructions 18 over communications network 20. Since there may be no relationship between merchant 14 and financial institution 22, a digital certificate may also be used to provide verification of the identity of merchant 14, as well as providing the merchant's public key for use in sending an encrypted response back to the merchant.

A second level of privacy and protection comprises encrypting the digitally signed financial transaction instructions 18 before transmission to financial institution 22. Since the digital signature of financial transaction instructions 18 that includes merchant payment instructions 17, such as the merchant's account number, leaves the merchant payment instructions in the clear, the merchant may have a strong motivation to further protect the privacy of the transaction. To further increase security, all or a portion of financial transaction instructions 18 may be encrypted by merchant 14 with a key preferably known only by the merchant and financial institution 22. Thus, similar to purchaser payment instructions 15, financial transaction instructions 18 are protected by secure mechanism 76 (FIG. 1) and transferred through communications network 20 to financial institution 22 (Block 124).

Financial institution 22 receives the protected financial transaction instructions 18 and decrypts them (Block 126). Financial institution 22 then validates financial transaction instructions 18, as well as insuring that purchase order information, purchaser's and merchant's transaction amount and other information utilized in performing the transaction is in agreement between purchaser 12 and merchant 14. As mentioned above, the present invention advantageously does not require any type of account relationship between purchaser 12, merchant 14 and financial institution 22. The purchaser 12 and/or merchant 14 only need to exchange keys with financial institution 22 for encryption/decryption purposes. Financial institution 22 then reformats card information 39 and security information 40 into transaction request 26 that meets the standard for an on-line ATM/POS transaction. Transaction request 26 is routed through and processed by on-line ATM/POS transaction system 24 (Block 128). Typically, transaction request 26 is required to be sent in an encrypted format over on-line ATM/POS network 24 according to set standards. For example, financial institution 22 such as Citibank® may route transaction request 26 through Citishare®, Citibank's ATM/POS network interface. Financial institution 22 and on-line ATM/POS transaction system 24 thus treat transaction request 26 as if it were an electronic transaction initiated at a merchant POS terminal, an ATM terminal or some other similar source directly connected to on-line ATM/POS transaction system 24. By formatting transaction request 26 as a typical on-line ATM/POS transaction, the present invention allows financial transaction instructions 18 to be universally accepted by existing on-line ATM/POS financial transaction networks. Thus, the settlement of financial transaction instructions 18 follows the standard procedure which is used for typical on-line ATM/POS transactions.

Purchaser's bank 28 decrypts (if necessary) transaction request 26 and verifies purchaser's card information 39 and security information 40. Additionally, purchaser's bank 28 performs a number of other checks, such to determine whether or not the card is stolen, the account is blocked, etc. Purchaser's bank 28 then approves or disapproves the transaction on-line and in real time, as it would any other on-line ATM/POS transaction initiated at an ATM or a merchant location (Block 130). Purchaser's bank 28 makes an approval/disapproval decision by determining if the account associated with card information 39 has sufficient funds to cover the transaction amount identified in transaction request 26. If approved, then the transaction amount is reserved from the identified account so that it is not available for later transactions. Purchaser's bank sends the approval/disapproval information in response message 30 to financial institution 22 through on-line ATM/POS transaction system 24 (Block 132). Financial institution 22 then sends authorization message 32 back to merchant 14 in real time (Block 134). The term "real time" preferably means a time in the range of about seconds to about minutes, although it could be longer. Preferably, the time period from initialization of the transaction to the merchant receiving authorization message 32 is real time. If approved, financial institution 22 initiates a credit, using traditional payment systems such as ACH system 38, to merchant's account at merchant's bank 34 in accordance with the instructions contained in merchant's payment instructions 17 (Block 136). The settlement of financial transaction instruction 18 typically occurs at the end of the business day of the transaction, as purchaser's account is debited and merchant's account is credited. Thus, with real time verified funding and confidence of a payment, a merchant is able to respond within minutes to an order over the Internet comprising a low cost financial transaction presented by a purchaser on a personal computer utilizing checking or savings account funds (Block 138).

Figure 4A:
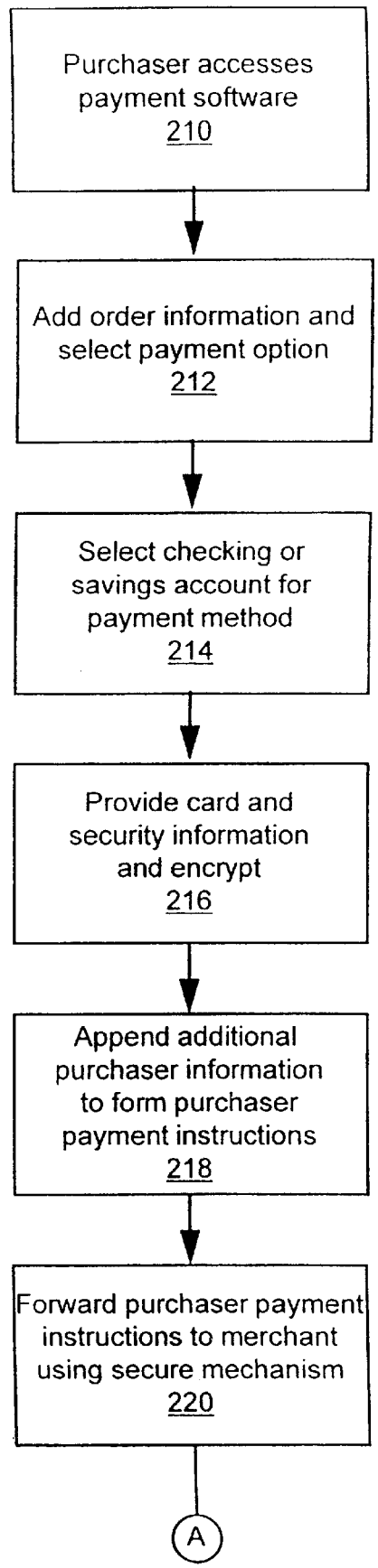
FIGS. 4A–4C are flow charts representing another embodiment of a method of the present invention.
Figure 4B:
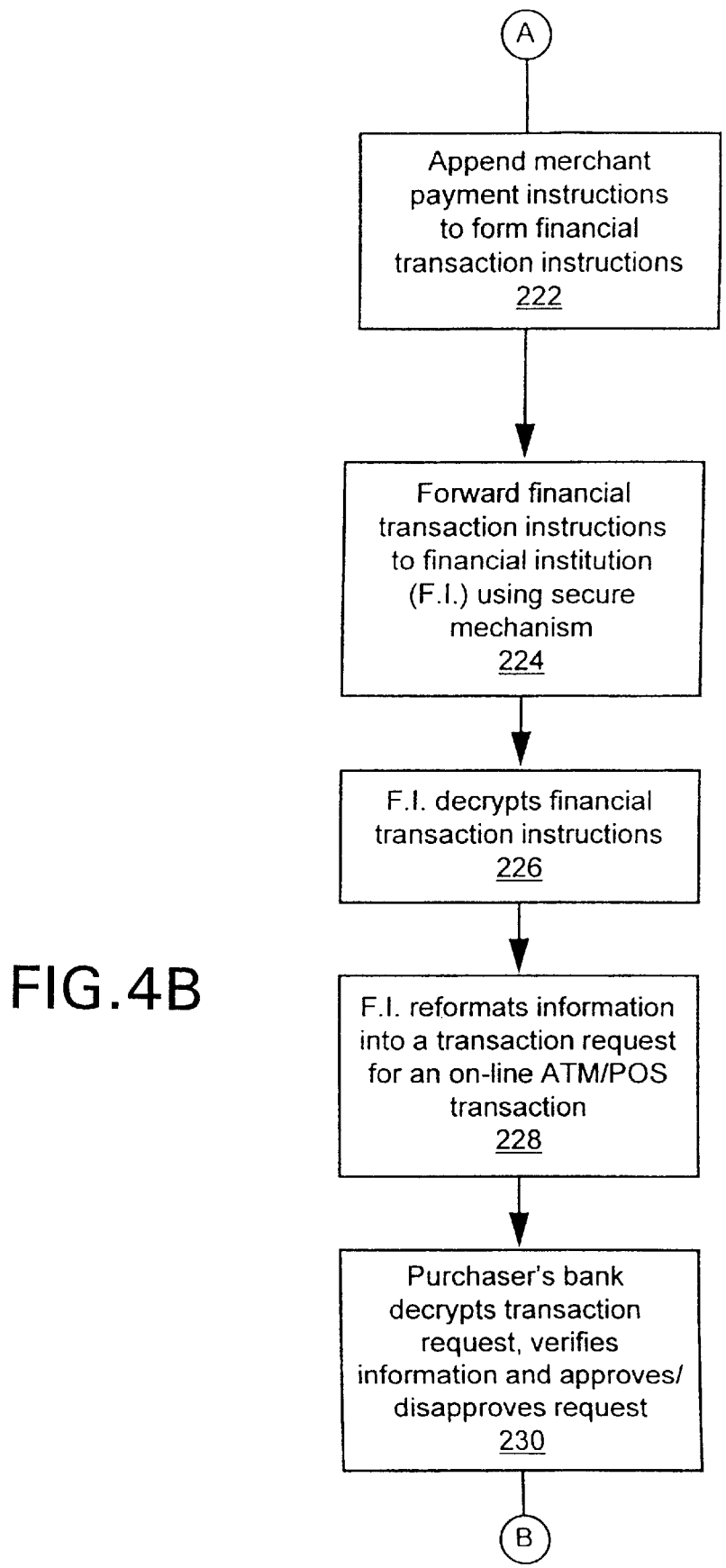
Figure 4C:
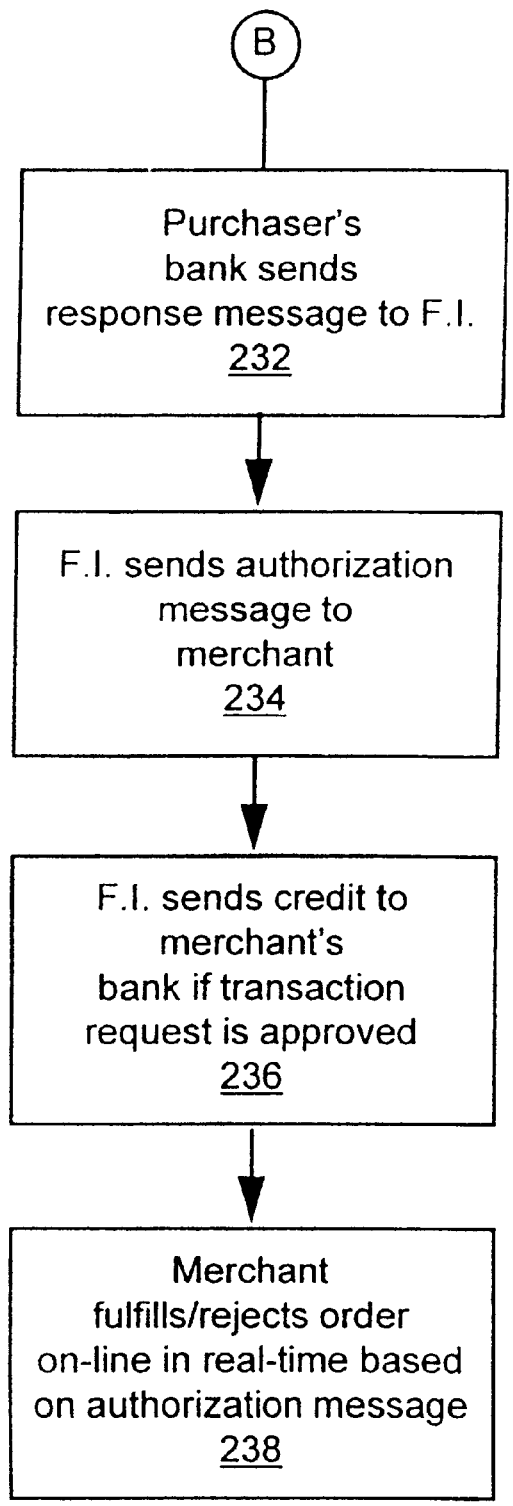

Referring to FIGS. 4A–4C, an e-mail method for performing an on-line ATM/POS transaction similar to that in FIGS. 3A–3C is described. Rather than the transaction being performed over a World Wide Web site, however, in FIGS. 4A–4C the transaction is performed via e-mail. As such, the initiation of the transaction is somewhat different. In performing an on-line ATM/POS transaction using e-mail, the purchaser accesses payment software in their computer that allows them to utilize their checking and savings account in an e-mail payment transaction (Block 210). The software allows order information to be associated with a selected payment option (Block 212). Once the appropriate account is selected (Block 214), the remainder of the method (Blocks 216–238) is basically the same as the method in FIGS. 3A–3C except that communications network 16 (FIG. 1) between purchaser and merchant and/or communications network 20 (FIG. 1) between merchant and financial institution is preferably e-mail.

The present invention advantageously allows any consumer with a valid ATM card or smart card, issued by any financial institution anywhere in the world, to utilize their checking or savings account from a personal computer in an on-line ATM/POS transaction over the Internet. Because the present invention provides a financial transaction instruction that can be utilized with existing on-line ATM/POS transaction systems, the option to perform a checking or savings account transaction over the Internet is available to anyone with a hardware device capable of reading information from an ATM card or smart card and the software to securely send the information over a public access network to a financial institution providing access to the on-line ATM/POS transaction system. The present invention allows any consumer having a valid ATM card or smart card to perform an electronic financial transaction instruction, regardless of whether or not their financial institution offers this service. Therefore, the availability of Internet transactions involving checking and savings accounts is dramatically expanded to all consumers having ATM or smart cards.

Additionally, the present system may also be utilized for numerous other transactions involving checking or savings accounts. For example, the present system may be advantageously utilized to electronically pay bills, transfer money between individuals, and to perform business to business payments using the World Wide Web, e-mail and all of the other Internet protocols.

Although the invention has been described with reference to these preferred embodiments, other embodiments can achieve the same results. Variations and modifications of the present invention will be apparent to one skilled in the art and the following claims are intended to cover all such modifications and equivalents.

What is claimed is:

1. A method of performing a financial transaction between a purchaser and a merchant, comprising:

under control of a service provider having a direct connection to an on-line ATM/POS transaction system, receiving via a first public access network an electronic financial transaction instruction initiated by the purchaser to make a purchase over the first public access network from the merchant, the financial transaction instruction comprising encrypted card information, encrypted security information and transaction amount information each suitable for use in an on-line ATM/POS transaction, wherein the card information and security information are encrypted according to ATM/POS transaction system standards, the card information including card number data and the security information including personal identification number data;

retrieving the card number data from the financial transaction instruction, wherein the card number data is associated with a checking or savings account in purchaser's bank for funding the financial transaction;

retrieving the personal identification number data, wherein the personal identification number data is associated with the card number data to identify the purchaser and authorize use of the card number data; and retrieving the transaction amount information;

generating a transaction request in a format for processing in the on-line ATM/POS transaction system using the card information, the security information and the transaction amount information; and forwarding the transaction request via the on-line ATM/POS transaction system to the purchaser's bank for authorization of the financial transaction between the purchaser and the merchant.

2. A method of performing a financial transaction as recited in claim 1, wherein the received financial transaction instruction further comprises a first secure mechanism having at least a first level of protection comprising performing an operation on the financial transaction instruction to provide verification of the identity of the purchaser and the integrity of the financial transaction instruction while leaving all of the financial transaction instruction in the clear except for the encrypted card information and the encrypted security information.

3. A method of performing a financial transaction as recited in claim 2, wherein the first level of protection comprises digitally signing the financial transaction instruction with the digital signature of the purchaser.

4. A method of performing a financial transaction as recited in claim 2, wherein the first level of protection comprises appending a digital certificate of the purchaser to the financial transaction instruction.

5. A method of performing a financial transaction as recited in claim 2, wherein the first secure mechanism further comprises a second level of protection including encrypting the financial transaction instruction for secure transmission over the first public access network.

6. A method of performing a financial transaction as recited in claim 5, wherein the encrypting the financial transaction for the second level of protection comprises encrypting in a manner decryptable by the merchant.

7. A method of performing a financial transaction as recited in claim 5, wherein the encrypting the financial transaction for the second level of protection comprises encrypting in a manner decryptable by the service provider.

8. A method of performing a financial transaction as recited in claim 5, further comprising the service provider decrypting and verifying the financial transaction instruction.

9. A method of performing a financial transaction as recited in claim 8, further comprising transmitting to the merchant an authorization message indicating the approval status of the transaction request.

10. A method of performing a financial transaction as recited in claim 2, wherein the first public access network is the Internet.

11. A method of performing a financial transaction as recited in claim 10, wherein the Internet protocol is the World Wide Web.

12. A method of performing a financial transaction as recited in claim 10, wherein the Internet protocol is electronic mail.

13. A method of performing a financial transaction as recited in claim 2, further comprising receiving merchant payment instructions appended to the financial transaction instruction.

14. A method of performing a financial transaction as recited in claim 13, wherein the received financial transaction instruction further comprises a second secure mechanism that protects the security of the financial transaction instruction for transmission over a second public access network, wherein the second secure mechanism provides verification of the identity of the merchant and the integrity of the financial transaction instruction.

15. A method of performing a financial transaction as recited in claim 14, wherein the second secure mechanism provides at least a third level of protection comprising performing an operation on the financial transaction instruction to provide verification of the identity of the merchant and the integrity of the financial transaction instruction while leaving all of the financial transaction instruction in the clear except for the encrypted card information and security information.

16. A method of performing a financial transaction as recited in claim 15, wherein the third level of protection comprises digitally signing the financial transaction instruction with the digital signature of the merchant.

17. A method of performing a financial transaction as recited in claim 15, wherein the third level of protection comprises appending a digital certificate of the merchant to the financial transaction instruction.

18. A method of performing a financial transaction as recited in claim 15, wherein the second secure mechanism further includes a second type of protection comprising encrypting the financial transaction instruction for secure transmission over the second public access network.

19. A method of performing a financial transaction as recited in claim 18, wherein encrypting the financial transaction for the second type of protection comprises encrypting in a manner decryptable by a financial institution providing access to the on-line ATM/POS transaction system.

20. A method of performing a financial transaction as recited in claim 18, further comprising decrypting the financial transaction instruction.

21. A method of performing a financial transaction as recited in claim 18, further comprising transmitting to the merchant an authorization message indicating the approval status of the transaction request.

22. A method of performing a financial transaction as recited in claim 14, wherein the second secure mechanism comprises encrypting the financial transaction instruction.

23. A method of performing a financial transaction between a purchaser and a merchant, comprising:
   under control of a purchaser computer connected through a first public access network to the merchant to make a purchase from the merchant,
      generating an electronic financial transaction instruction for the purchaser to make a purchase over the first public access network from the merchant, the financial transaction instruction comprising card information, security information and transaction amount information each suitable for use in an on-line ATM/POS transaction, wherein the card information and security information are encrypted according to ATM/POS transaction system standards;
      including card number data with the card information, wherein the card number data is associated with a checking or savings account in purchaser's bank for funding the on-line ATM/POS transaction;
      including personal identification number data with the security information, wherein the personal identification number data is associated with the card number data to identify the purchaser and authorize use of the card number data; and
      protecting the security of the financial transaction instruction for transmission over the first public access network by utilizing a first secure mechanism, wherein the first secure mechanism comprises a first level of protection and a second level of protection, wherein the first level of protection comprises performing an operation on the financial transaction instruction to provide verification of the identity of the purchaser and the integrity of the financial transaction instruction while leaving all of the financial transaction instruction in the clear except for the encrypted card information and security information, and wherein the second level of protection comprises encrypting the financial transaction instruction for secure transmission over the first public access network,
   under control of a service provider having a direct connection to the on-line ATM/POS transaction system,
      receiving the financial transaction instruction;
      retrieving the card information, the security information and the transaction amount information;
      generating a transaction request in a format for processing in the on-line ATM/POS transaction system using the card information, the security information and the transaction amount information; and
      forwarding the transaction request via the on-line ATM/POS transaction system to the purchaser's bank for authorization of the financial transaction between the purchaser and the merchant.

24. A method of performing a financial transaction as recited in claim 23, wherein creating the financial transaction instruction is performed on a personal computer external from the on-line ATM/POS transaction system.

25. A method of performing a financial transaction as recited in claim 24, wherein the first public access network is the Internet.

26. A method of performing a financial transaction as recited in claim 25, wherein the Internet protocol is the World Wide Web.

27. A method of performing a financial transaction as recited in claim 25, wherein the Internet protocol is electronic mail.

28. A method of performing a financial transaction as recited in claim 24, wherein the first level of protection comprises digitally signing the financial transaction instruction with the digital signature of the purchaser.

29. A method of performing a financial transaction as recited in claim 24, wherein the first level of protection comprises appending a digital certificate of the purchaser to the financial transaction instruction.

30. A method of performing a financial transaction as recited in claim 24, further comprising the service provider transmitting to the merchant an authorization message indicating the approval status of the transaction request.

31. A method of performing a financial transaction between a purchaser and a merchant, comprising:
   under control of a purchaser computer connected through a first public access network to the merchant to make a purchase from the merchant,
      generating an electronic purchaser payment instruction for the purchaser to make a purchase over the first public access network from the merchant, the purchaser payment instruction comprising card information, security information and transaction amount information each suitable for use in an on-line ATM/POS transaction, wherein the card information and security information are encrypted according to ATM/POS transaction system standards;

including card number data with the card information, wherein the card number data is associated with a checking or savings account in purchaser's bank for funding the on-line ATM/POS transaction;

including personal identification number data with the security information, wherein the personal identification number data is associated with the card number data to identify the purchaser and authorize use of the card number data;

protecting the security of the purchaser payment instruction for transmission over the first public access network by utilizing a first secure mechanism, wherein the first secure mechanism comprises a first level of protection and a second level of protection, wherein the first level of protection comprises performing an operation on the purchaser payment instruction to provide verification of the identity of the purchaser and the integrity of the purchaser payment instruction while leaving all of the purchaser payment instruction in the clear except for the encrypted card information and security information, and wherein the second level of protection comprises encrypting the purchaser payment instruction for secure transmission over the first public access network;

under control of the merchant,
appending merchant payment instructions to the purchaser payment instruction to form a financial transaction instruction; and
protecting the security of the financial transaction instruction for transmission over a second public access network by utilizing a second secure mechanism, wherein the second secure mechanism provides verification of the identity of the merchant and the integrity of the financial transaction instruction;

under control of a service provider having a direct connection to the on-line ATM/POS transaction system,
receiving the financial transaction instruction;
retrieving the card information, the security information and the transaction amount information;
generating a transaction request in a format for processing in the on-line ATM/POS transaction system using the card information, the security information and the transaction amount information;
forwarding the transaction request via the on-line ATM/POS transaction system to the purchaser's bank for authorization;
receiving a response message from the purchaser's bank indicating an approval or denial of the transaction request;
generating an authorization message based on the indicated approval or denial in the response message; and
forwarding the authorization message to the merchant, over the first public access network, that notifies the merchant of the approval or denial of the financial transaction.

32. A method of performing a financial transaction as recited in claim 31, wherein the first public access network and the second public access network are both the Internet.

33. A method of performing a financial transaction as recited in claim 32, wherein the Internet protocol is the World Wide Web.

34. A method of performing a financial transaction as recited in claim 32, wherein the Internet protocol is electronic mail.

35. A method of performing a financial transaction as recited in claim 31, wherein the first level of protection comprises digitally signing the financial transaction instruction with the digital signature of the purchaser.

36. A method of performing a financial transaction as recited in claim 31, wherein the first level of protection comprises appending a digital certificate of the purchaser to the financial transaction instruction.

37. A method of performing a financial transaction as recited in claim 31, wherein the second secure mechanism provides at least a third level of protection comprising performing an operation on the financial transaction instruction to provide verification of the identity of the merchant and the integrity of the financial transaction instruction while leaving all of the financial transaction instruction in the clear except for the encrypted card information and security information.

38. A method of performing a financial transaction as recited in claim 37, wherein the third level of protection comprises digitally signing the financial transaction instruction with the digital signature of the merchant.

39. A method of performing a financial transaction as recited in claim 37, wherein the third level of protection comprises appending a digital certificate of the merchant to the financial transaction instruction.

40. A method of performing a financial transaction as recited in claim 37, wherein the second secure mechanism further includes a fourth level of protection comprising encrypting the financial transaction instruction for secure transmission over the second public access network.

41. A method of performing a financial transaction as recited in claim 40, wherein the encrypting the financial transaction for the fourth level of protection comprises encrypting in a manner decryptable by a financial institution providing access to the on-line ATM/POS transaction system.

42. A method of performing a financial transaction as recited in claim 31, wherein the second secure mechanism comprises encrypting the financial transaction instruction.

43. A financial transaction system, comprising:
an electronic financial transaction instruction in a first secured format initiated by a purchaser to make a purchase from a merchant over an electronic public access network, said financial transaction instruction comprising encrypted card information and security information, wherein said card information comprises identification of a checking or savings account held by said purchaser to be debited in said financial transaction and wherein said security information comprises a personal identification number known by said purchaser to authorize the use of said card information in said on-line ATM/POS transaction, and wherein said first secured format is a format that enables secure transmission over the first public access network of said financial transaction instruction to guarantee the identity of said purchaser and the integrity of said financial transaction instruction; and
a service provider connected to an on-line ATM/POS transaction system and connected to the first public access network, the service provider receiving the financial transaction instruction over the first public access network and generating a transaction request in a format for processing in the on-line ATM/POS transaction system using the card information, the security information and the transaction amount information, the service provider forwarding the transaction request via the on-line ATM/POS transaction system to the purchaser's bank for authorization and receiving a response message from the purchaser's bank indicating an approval or denial of the transaction request, the service provider generating an authorization message based on the indicated approval or denial in the response message and forwarding the authorization message to the merchant, over the first public access network, that notifies the merchant of the approval or denial of the financial transaction.

44. A method of performing a financial transaction, comprising:

accessing by a purchaser via a first public access network a site of a merchant;

generating a purchaser payment instruction, by the purchaser via the public access network, to order a purchase from the merchant, the purchase payment instruction including an exchange of a transaction amount between the purchaser and the merchant;

attaching card information from a memory of a purchaser's card to the purchaser payment instruction, the card information including purchaser account information associated with a purchaser's account at a purchaser's bank to be debited by the transaction amount;

attaching a personal identification number known by the purchaser to the purchaser payment instruction, the personal identification number associated with the account information to authorize the use of the account information;

encrypting the card information and the personal identification number using an encryption standard compatible with a format for processing in an ATM/POS transaction system;

applying a first secure mechanism to the purchaser payment instruction, the first secure mechanism enabling secure transmission over the first public access network of the purchaser payment instruction to guarantee the identity of the purchaser and the integrity of the purchaser payment instruction;

receiving the purchaser payment instruction by the merchant;

appending a merchant payment instruction to the purchaser payment instruction to form a financial transaction instruction, the merchant payment instruction including merchant account information associated with a merchant's account at a merchant's bank to be credited by the transaction amount;

applying a second secure mechanism to the financial transaction instruction, the second secure mechanism enabling secure transmission over a second public access network of the financial transaction instruction to guarantee the identity of the merchant and the integrity of the financial transaction instruction;

receiving the financial transaction instruction at a service provider via the second public access network, the service provider having a connection with the on-line ATM/POS transaction system;

retrieving, by the service provider, the card information, the security information and the transaction amount;

generating, by the service provider, a transaction request in a format for processing in the on-line ATM/POS transaction system using the card information, the security information and the transaction amount;

forwarding, by the service provider, the transaction request to the purchaser's bank via the on-line ATM/POS transaction system for authorization;

receiving, by the service provider, a response message from the purchaser's bank indicating an approval or denial of the transaction request;

generating, by the service provider, an authorization message based on the indicated approval or denial in the response message; and forwarding, by the service provider, the authorization message to the merchant, over the first public access network, that notifies the merchant of the approval or denial of the financial transaction.

45. The method of claim 44, wherein the first public access network and the second public access network are both the Internet.

46. The method of claim 44, wherein the first secure mechanism comprises a first level of protection and a second level of protection, wherein the first level of protection comprises a security method selected from the group consisting of applying a digital signature of the purchaser to the purchaser payment instruction and appending a digital certificate of the purchaser to the purchaser payment instruction, and wherein the second level of protection comprises applying a first encryption format to the purchaser payment instruction, where the first encryption format is decryptable by the purchaser and the service provider.

47. The method of claim 44, wherein the second secure mechanism comprises a third level of protection and a fourth level of protection, wherein the third level of protection comprises a security method selected from the group consisting of applying a digital signature of the merchant to the financial transaction instruction and appending a digital certificate of the purchaser to the financial transaction instruction, and wherein the fourth level of protection comprises applying a second encryption format to the financial transaction instruction, where the second encryption format is decryptable by the merchant and the service provider.

* * * * *